United States Patent
Economy et al.

(10) Patent No.: US 8,982,825 B2
(45) Date of Patent: Mar. 17, 2015

(54) METHOD AND DEVICE TO SUPPORT SITE ACTIVATION USING A HAILING CHANNEL

(71) Applicant: Motorola Solutions, Inc., Schaumburg, IL (US)

(72) Inventors: George R. Economy, Arlington Heights, IL (US); Roger M. Vilmur, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 192 days.

(21) Appl. No.: 13/800,424

(22) Filed: Mar. 13, 2013

(65) Prior Publication Data

US 2014/0269521 A1   Sep. 18, 2014

(51) Int. Cl.
*H04W 4/00* (2009.01)
*H04L 5/00* (2006.01)

(52) U.S. Cl.
CPC .................................. *H04L 5/0053* (2013.01)
USPC .......................... 370/329; 370/328; 455/456.1

(58) Field of Classification Search
None
See application file for complete search history.

(56) References Cited

U.S. PATENT DOCUMENTS

| | | | |
|---|---|---|---|
| 5,123,110 A | 6/1992 | Grube | |
| 5,231,699 A | 7/1993 | Tendler | |
| 5,377,193 A | 12/1994 | Grube et al. | |
| 5,625,878 A | 4/1997 | Lopponen et al. | |
| 5,689,801 A | 11/1997 | Frichtel et al. | |
| 6,097,928 A | 8/2000 | Jeon | |
| 6,501,951 B2 * | 12/2002 | Moore | 455/434 |
| 7,136,664 B1 | 11/2006 | Cassidy et al. | |
| 7,616,933 B2 * | 11/2009 | Moore | 455/161.2 |
| 7,840,219 B2 | 11/2010 | Ludovico et al. | |
| 8,660,134 B2 * | 2/2014 | Splitz et al. | 370/432 |
| 2003/0058824 A1 | 3/2003 | Petterson et al. | |
| 2009/0135780 A1 * | 5/2009 | Kitchin | 370/329 |
| 2010/0041401 A1 * | 2/2010 | Moore | 455/434 |
| 2011/0105104 A9 | 5/2011 | Petterson et al. | |
| 2012/0039201 A1 | 2/2012 | Roy et al. | |
| 2012/0165007 A1 | 6/2012 | Martin | |
| 2013/0107772 A1 * | 5/2013 | Splitz et al. | 370/311 |

FOREIGN PATENT DOCUMENTS

| | | |
|---|---|---|
| EP | 568659 B1 | 12/1999 |
| EP | 74089181 B1 | 4/2002 |
| EP | 1215930 B1 | 4/2005 |
| WO | WO 9315573 * | 8/1993 |
| WO | 2005041606 A1 | 5/2005 |

* cited by examiner

Primary Examiner — Michael J Moore, Jr.
(74) Attorney, Agent, or Firm — Daniel R. Bestor

(57) ABSTRACT

A trunked base station (BS) in a trunked radio system tunes its receiver to the hailing channel and monitors for a hailing signal. A subscriber unit (SU) scans a first set of control channels for a control signal transmitted by the trunked BS. In response to failing to locate a control signal on any one of the first set of control channels, the SU tunes its transmitter to a hailing channel and transmits a hailing signal. In response to receiving a hailing signal from a SU, the BS tunes to a transmit portion of a trunked control channel and transmits a control signal. And the BS subsequently tunes to a receive portion of the trunked control channel and monitors for a registration response. Subsequently, the SU scans a second set of control channels for a control signal transmitted by a BS in the system.

22 Claims, 5 Drawing Sheets

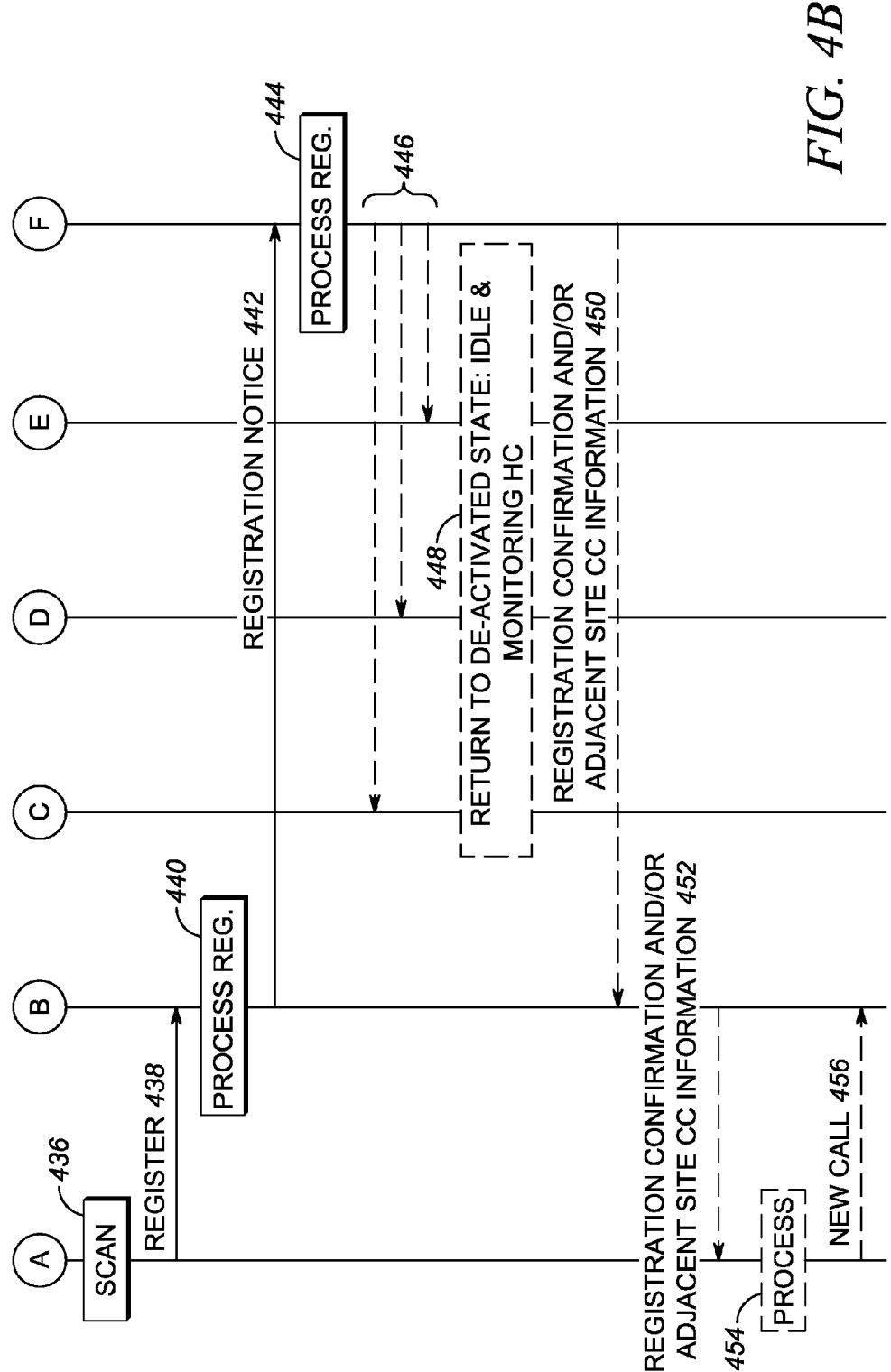

METHOD AND DEVICE TO SUPPORT SITE ACTIVATION USING A HAILING CHANNEL

FIELD OF THE DISCLOSURE

The present disclosure relates to digital radio communication systems, in general, and to site activation using a hailing channel, in particular.

BACKGROUND OF THE DISCLOSURE

Radio access networks (RANs) provide for radio communication links to be arranged within the system between a plurality of user terminals. Such user terminals may be mobile and may be known as 'subscriber units' or 'subscriber units.' At least one other terminal, e.g. used in conjunction with subscriber units, may be a fixed terminal, e.g. a control terminal, base station, eNodeB, repeater, and/or access point. Such a RAN typically includes a system infrastructure which generally includes a network of various fixed terminals, which are in direct radio communication with the subscriber units. Each of the fixed terminals operating in the RAN may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the RAN are made via respective serving fixed terminals. Sites of neighbouring fixed terminals may be offset from one another or may be non-overlapping or partially or fully overlapping.

RANs may operate according to an industry standard protocol such as, for example, the Project 25 (P25) standard defined by the Association of Public Safety Communications Officials International (APCO), or other radio protocols, such as the terrestrial trunked radio (TETRA) standard defined by the European Telecommunication Standards Institute (ETSI) or the Digital Mobile Radio (DMR) standard also defined by the ETSI. Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in RANs such as those set forth above send user communicated speech and data, herein referred to collectively as 'traffic information', in accordance with the designated protocol.

Many so-called 'public safety' RANs provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force group. Many of these 'public safety' RANs have been deployed in dense urban and suburban areas.

Same or similar wireless communication systems may be used in more remote areas of the country, such as rural areas, where events occur less often, where a large number of sites provide service over a large geography containing few users, where fewer resources are generally available, and where operating costs may be a larger concern given the reduced number of occurrences for which each wireless communication system is needed. For example, many current trunked systems require a radio site to continuously be "on" such that a fixed terminal in the trunked site is continuously on the air and a control channel is continuously being transmitted. This allows radios that are within the proximity of the trunked site to be able to identify the trunked site, switch to the trunked site when needed, and receive and transmit control information, including, for example, new call requests, over the control channel of the trunked site.

However, a significant drawback of continuous, periodic, or intermittent required broadcasts is that it may cause unnecessary power consumption (which may be costly) when the radio site is not currently being used. This problem may be exaggerated in lower density regions where incidents occur with less frequency. However, such radio systems may be used in emergencies, and so still must be highly available. Accordingly, what is needed is an improved method for conserving resources in lower density regions while still providing for the high performance and high availability required of emergency response radio systems.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 4A and 4B include a ladder diagram illustrating an example message and processing flow for activating radio sites using a hailing channel in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

As set forth above, there is a need for an improved method for conserving resources in lower density regions while still providing for the high performance and high availability required of emergency response radio systems.

According to a first embodiment of the present disclosure, a subscriber unit scans a first set of control channels for a control signal transmitted by a trunked base station in a trunked radio system. In response to failing to locate a control signal on any one of the first set of control channels, the subscriber unit tunes its transmitter to a hailing channel and transmits a hailing signal. Subsequently, the SU scans a second set of control channels for a control signal transmitted by a base station in the system.

According to a second embodiment of the present disclosure, a trunked base station tunes its receiver to the hailing channel and monitors for a hailing signal. In response to receiving a hailing signal from a subscriber unit, it tunes to a transmit portion of a trunked control channel and transmits a control signal. And subsequently tunes to a receive portion of the trunked control channel and monitors for a registration response.

Each of the above-mentioned embodiments will be discussed in more detail below, starting with example network and device architectures of the system in which the embodiments may be practiced, followed by a discussion of activation and de-activation of radio sites using a hailing channel from a system perspective. Further advantages and features consistent with this disclosure will be set forth in the following detailed description, with reference to the figures.

I. Network And Device Architectures

Figure 1:
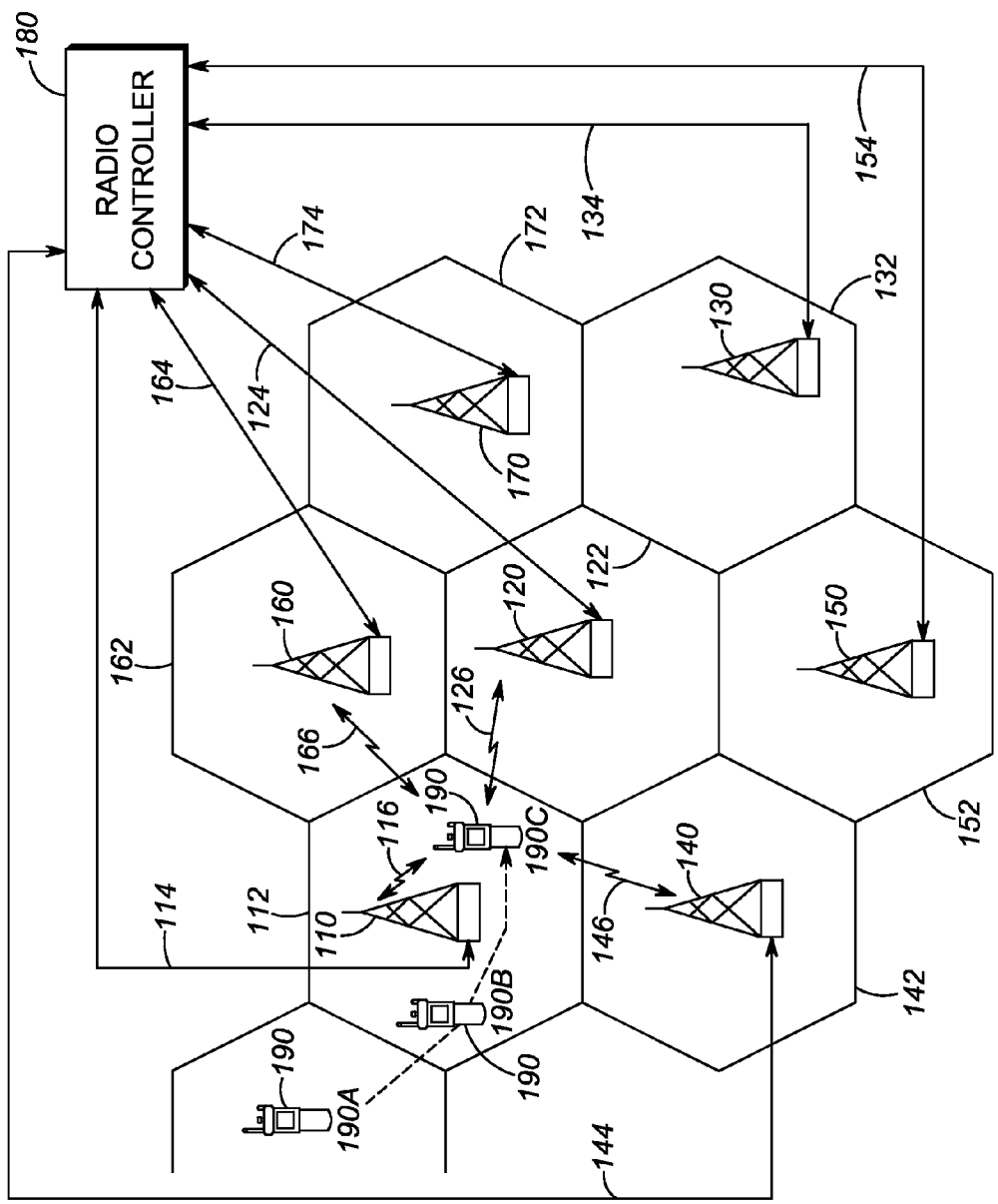
FIG. 1 is a schematic illustration of a radio communication system operating in accordance with an embodiment.

Referring to FIG. 1, one embodiment of a wireless communication system 100 according to the present disclosure is shown.

It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 includes one or more fixed terminals (e.g., base stations/eNodeBs/repeaters/control terminals) (BSs) 110, 120, 130, 140, 150, 160, 170, dynamically configurable as a hailing channel receiver, and each having a corresponding radio site (e.g., coverage area) 112, 122, 132, 142, 152, 162, 172 over which wireless communication services are respectively provided, and each of which may be operably connected to a system infrastructure including a radio controller 180 via respective wired or wireless links 114, 124, 134, 144, 154, 164, 174. While the term BS will be used to refer to the fixed terminals, for ease of reference, it should be noted that the fixed terminals may, in some embodiments, be a repeater, an eNodeB, or a control terminal, or some other type of fixed terminal. Each BS 110, 120, 130, 140, 150, 160, 170 may, from time to time, have radio links with a one or more subscriber units, particularly subscriber units (SUs) in the corresponding radio site.

The radio controller 180 may be or include, for example, a zone controller, and may provide a signalling path between BSs and act to manage resources (such as control and/or traffic channels) at the BSs. The radio controller 180 may also function to activate (e.g., cause to transmit a control signal on an associated control channel) or de-activate (e.g., refrain from transmitting a control signal on an associated control channel and instead monitor a hailing channel for a hailing signal), or aid in activating or de-activating, each BS responsive to a determination of whether resources are currently, or will likely be, needed by SUs roaming near or into a corresponding radio site. While the radio controller 180 is illustrated in FIG. 1 as a separate logical entity, in other embodiments, the functionality described herein could be integrated into a BS or other logical entity at a radio site, or distributed across a plurality of radio sites, in which case the radio controller 180 entity illustrated in FIG. 1 would be replaced by a local area network (LAN) or wide area network (WAN). The radio controller 180 may provide other functions to the BSs and/or SUs as well.

Each of the BSs 110, 120, 130, 140, 150, 160, 170 and corresponding radio site 112, 122, 132, 142, 152, 162, 172 may operate as a trunked radio site. In a trunked radio system, SUs use a pool of channels for virtually an unlimited number of groups. Thus, all groups are served by all channels. For example, in one trunking system, all SUs operating at a radio site idle on a designated control channel or rest channel and when a new call is requested over the control or rest channel, is assigned a new traffic channel for the new group call while remaining SUs not participating in the new group call stay on the designated control channel or rest channel. In another trunking system, all SUs operating at a radio site idle on a designated control channel or rest channel and when a new call is requested over the control or rest channel, the current control or rest channel is converted to a traffic channel for the call while a new control channel is assigned and identified for SUs not participating in the call to switch to. Other trunked configurations are possible as well.

A single SU 190 is illustrated in FIG. 1 as operating within the wireless communication system 100. While only one SU 190 is shown, for ease of illustration and description, in other embodiments, a plurality of SUs may be active in any one or more radio sites illustrated in FIG. 1.

In one example, each BS, such as BS 110, serves SUs within its coverage area, such as SU 190 at location 190C in radio site 112, with radio communications to and from other terminals, the other terminals including (i) SUs served by the same BS (e.g., BS 110), (ii) SUs (not shown) served by other BSs (e.g., BSs 120, 130, 140, 150, 160, 170), and (iii) other terminals including SUs in other systems (not shown) operably linked to the system 100 via the system infrastructure.

A system infrastructure supporting each BS, in addition to radio controller 180, may include known sub-systems (not shown) required for operation of the system 100. Such sub-systems may include, for example, sub-systems providing authentication, routing, SU registration and location, system management and other operational functions within the system 100, some of which may be provided by radio controller 180. The system infrastructure may additionally provide routes to other BSs (not shown) providing radio sites serving other SUs, and/or may provide access to other types of networks such as a plain old telephone system (POTS) network or a data-switched network such as the Internet (not shown).

For the purpose of illustrating methods and devices for activating and de-activating radio sites using a hailing channel, FIG. 1 illustrates a movement of SU 190 (in a disabled state that may include a powered-off state or transmitter and/or receiver inhibited state) from an initial location 190A to a second location 190B within radio site 112 (in a still powered-off or disabled state), then to a third location 190C still within radio site 112 but towards adjacent radio site 122, at which time the SU 190 is switched from the disabled state to an enabled state (e.g., a powered-on state or transmitter and/or receiver uninhibited state). Prior to the SU 190 switching to the enabled state at third location 190C, it is assumed that all of the radio sites 112, 122, 132, 142, 152, 162, 172 are currently de-activated (e.g., they are idle and not transmitting a control signal on a respective control channel, and are monitoring a pre-configured system-wide hailing channel, perhaps pre-configured at each BS or identified at each BS by an instruction from radio controller 180, while in the de-activated state).

Figure 2:
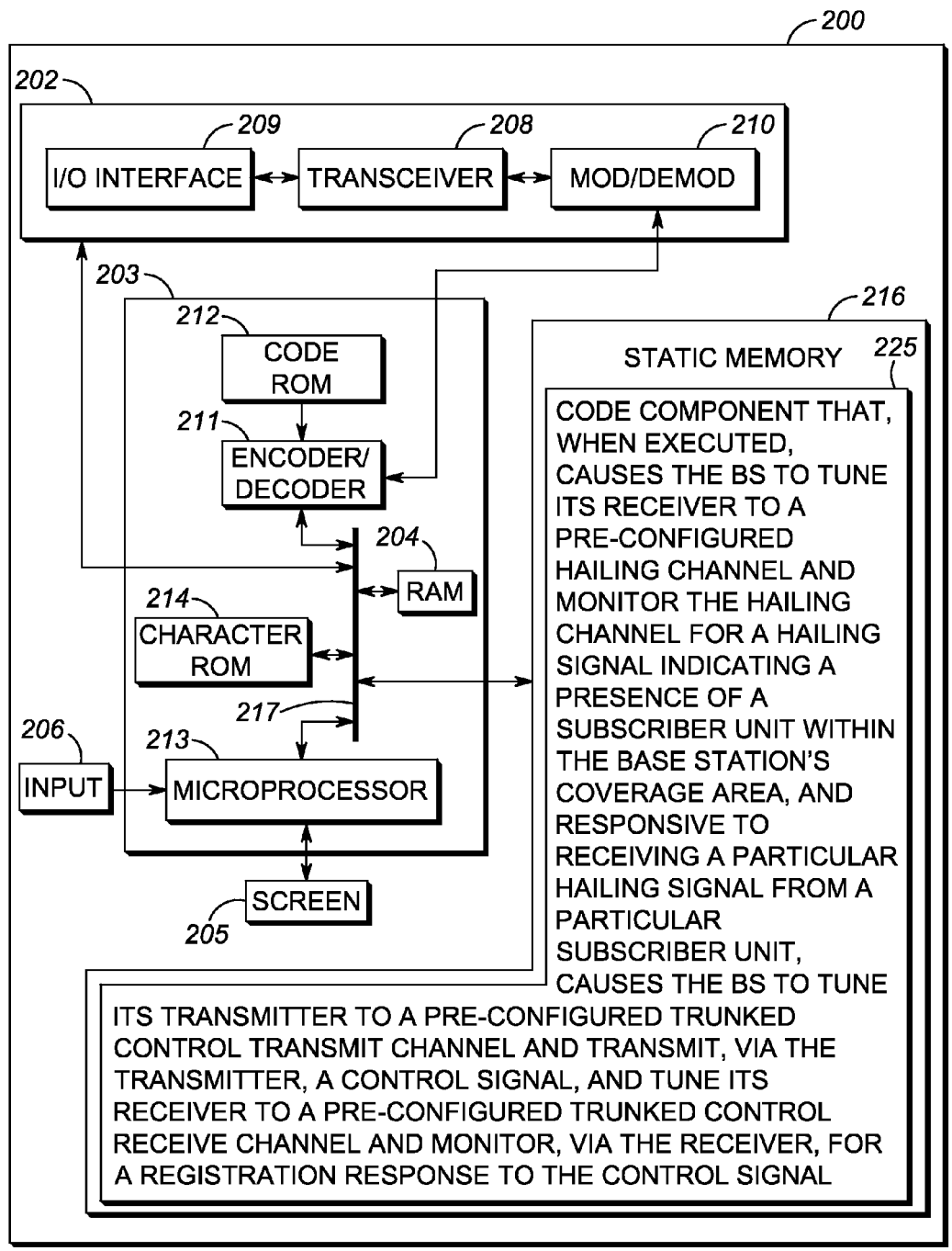
FIG. 2 is a block diagram of a trunked base station capable of operating in the communication system of FIG. 1 in accordance with an embodiment.
Figure 3:
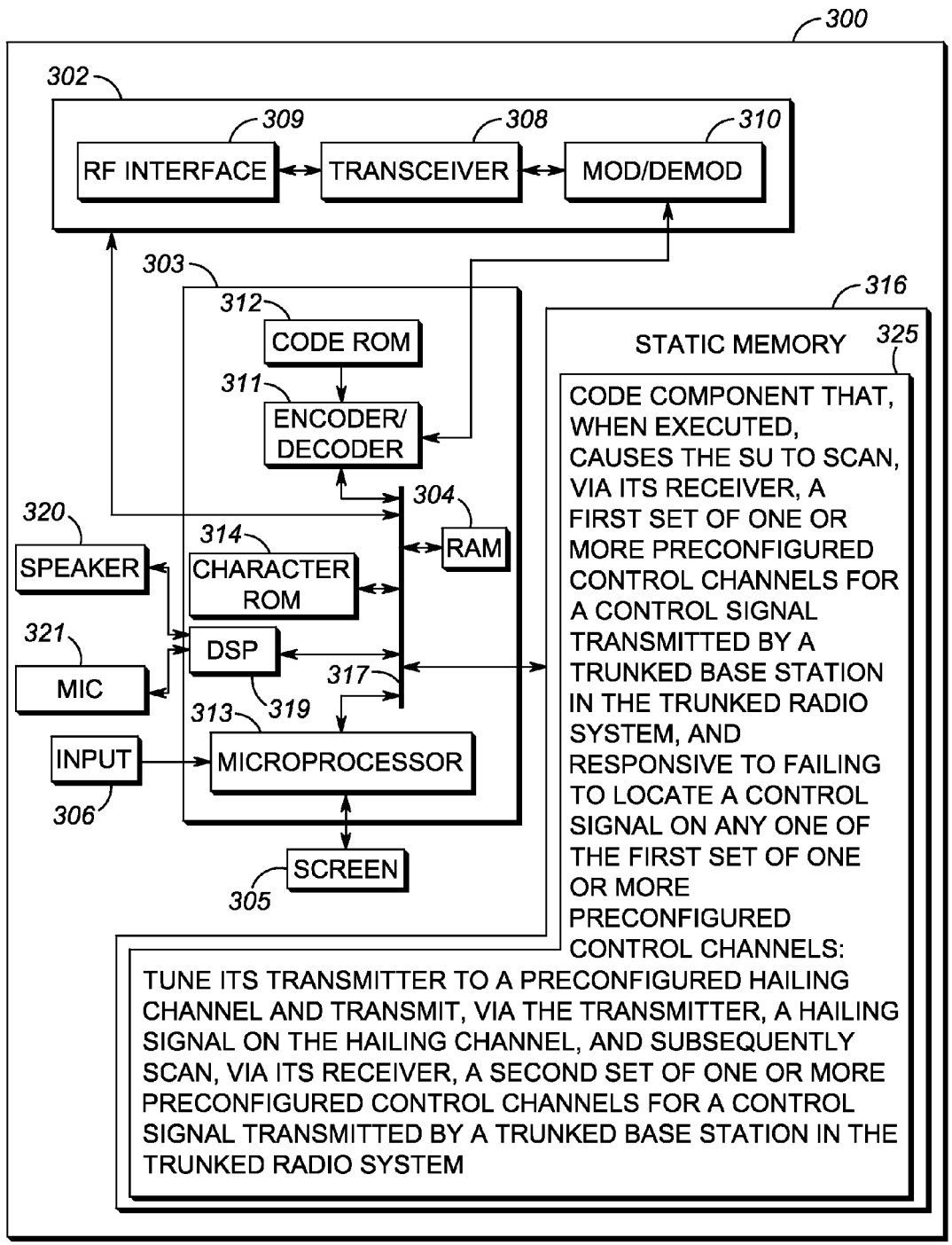
FIG. 3 is a block diagram of a subscriber unit capable of operating in the communication system of FIG. 1 in accordance with an embodiment.
Figure 4A:
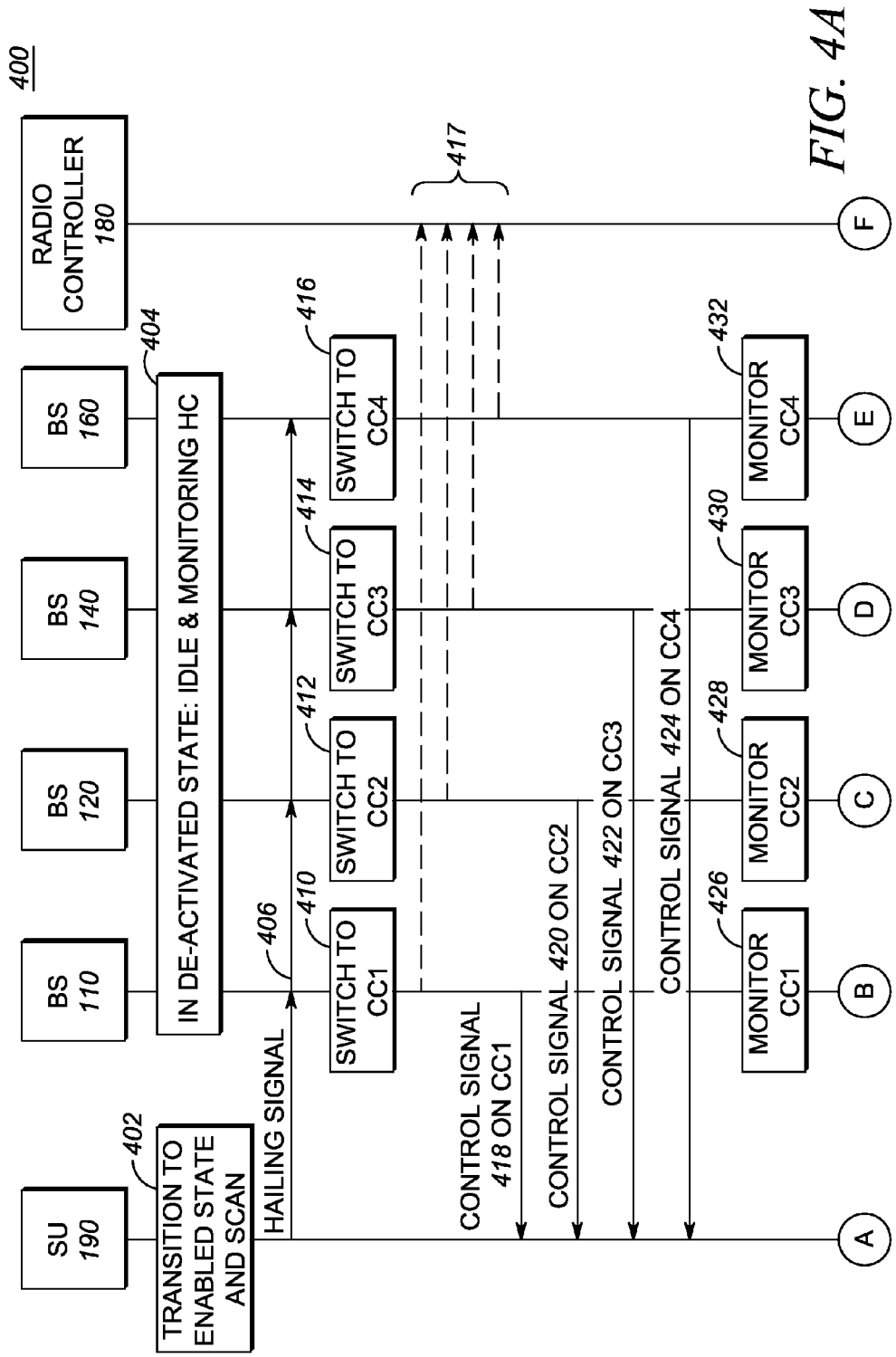

FIG. 2 will next illustrate a functional block diagram of a structure of a BS, after which FIG. 3 will illustrate a functional block diagram of a structure of a SU, and FIGS. 4A and 4B will illustrate a message flow diagram showing processing steps at and messaging flows between the SU 190, BSs 110, 120, 130, 140, 150, 160, 170, and radio controller 180, as the SU 190 moves from location 190A to location 190C and transitions from the disabled state to the enabled state at location 190C.

FIG. 2 is an example functional block diagram of a BS 200, such as BS 110, operating within the system 100 of FIG. 1 in accordance with some embodiments. Other BSs in FIG. 1, such as BSs 120, 130, 140, 150, 160, and/or 170, may contain same or similar structures. As shown in FIG. 2, BS 200 includes a communications unit 202 coupled to a common data and address bus 217 of a processing unit 203. The BS 200 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals that may be transmitted or received between other BSs or SUs in the system 100, or perhaps with a radio controller such as radio controller 180 of FIG. 1. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with SUs such as SU 109, with other BSs such as BSs 120, 130, 140, 150, 160, 170, and/or with other system infrastructure devices such as radio controller 180. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding and/or encoding data such as control signals, hailing signals, other control signalling, and/or data or voice messages that may be transmitted or received by the BS 200. Static memory 216 may store operating code for the microprocessor 213 that, when executed, causes the BS to tune its receiver to a pre-configured hailing channel and monitor the hailing channel for a hailing signal indicating a presence of a subscriber unit within the base station's coverage area, and responsive to receiving a particular hailing signal from a particular subscriber unit, causes the BS to tune its transmitter to a pre-configured trunked control transmit channel and transmit, via the transmitter, a control signal, and tune its receiver to a pre-configured trunked control receive channel and monitor, via the receiver, for a registration response to the control signal, in accordance with the one or more processing steps and message transmissions set forth in FIGS. 4A and 4B and corresponding text. Static memory 216 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

FIG. 3 is an example internal functional block diagram of a SU 300, such as the SU 190 of FIG. 1 that may operate in the system 100. Other SUs may contain same or similar structures. As shown in FIG. 3, SU 300 includes a communications unit 302 coupled to a common data and address bus 317 of a processing unit 303. The SU 300 may also include an input unit (e.g., keypad, pointing device, etc.) 306, an output transducer unit (e.g., speaker) 320, an input transducer unit (e.g., a microphone) 321, and a display screen 305, each coupled to be in communication with the processing unit 303.

The processing unit 303 may include an encoder/decoder 311 with an associated code ROM 312 for storing data for encoding and decoding voice, data, control, or other signals that may be transmitted or received between BSs or other SUs. The processing unit 303 may further include a microprocessor 313 coupled, by the common data and address bus 317, to the encoder/decoder 311, a character ROM 314, a RAM 304, and a static memory 316. The processing unit 303 may also include a digital signal processor (DSP) 319, coupled to the speaker 320, the microphone 321, and the common data and address bus 317, for operating on audio signals received from one or more of the communications unit 302, the static memory 316, and the microphone 321.

The communications unit 302 may include an RF interface 309 configurable to communicate with BSs and other SUs within the BS's 300 communication range. The communications unit 302 may include one or more broadband wireless transceivers 308, such as an LTE transceiver, a 3G (3GGP or 3GGP2) transceiver, a WiMAX transceiver perhaps operating in accordance with an IEEE 802.16 standard, and/or other similar type of wireless transceiver configurable to communicate via a wireless network, for infrastructure communications. Additionally or alternatively, communication unit 302 may include one or more second narrowband radio transceivers such as an APCO P25 transceiver, a DMR transceiver, a TETRA transceiver, or one or more second local area network or personal area network transceivers such as Wi-Fi transceiver perhaps operating in accordance with an IEEE 802.11 standard (e.g., 802.11a, 802.11b, 802.11g) or a Bluetooth transceiver. The transceiver 308 is also coupled to a combined modulator/demodulator 310 that is coupled to the encoder/decoder 311. The character ROM 314 stores code code for decoding and/or encoding data such as control signals, hailing signals, other control signalling, and/or data or voice messages that may be transmitted or received by the SU 300.

Static memory 316 may store operating code 325 for the microprocessor 313 that, when executed, causes the SU 300 to scan, via its receiver, a first set of one or more preconfigured control channels for a control signal transmitted by a trunked base station in the trunked radio system, and responsive to failing to locate a control signal on any one of the first set of one or more preconfigured control channels: tune its transmitter to a preconfigured hailing channel and transmit, via the transmitter, a hailing signal on the hailing channel, and subsequently scan, via its receiver, a second set of one or more preconfigured control channels for a control signal transmitted by a trunked base station in the trunked radio system, in accordance with the one or more processing steps and message transmissions set forth in FIGS. 4A and 4B and corresponding text. Static memory 316 may comprise, for example, a HDD, an optical disk drive such as a CD drive or DVD drive, a SSD, a tape drive, a flash memory drive, or a tape drive, to name a few.

II. Activation Of Radios Sites Using A Hailing Channel

FIGS. 4A and 4B set forth example message and processing flows for activation of radio sites using a hailing channel in accordance with some embodiments. In the examples set forth in detail below, only particular sequences are disclosed with respect to the SU and the BS. Of course, additional steps or message transmissions not disclosed herein could be additionally added before, after, or in-between steps or message transmissions disclosed in FIGS. 4A and 4B, and the presence of such additional steps or message transmissions would not negate the purpose and advantages of the examples set forth in detail throughout the remainder of this disclosure. Steps or message transmissions drawn with a dashed outline in FIGS. 4A and 4B should be understood to be optional steps or message transmissions.

FIGS. 4A and 4B, in particular, illustrate one example of processing steps that may be executed at, and messages that may flow between, the SU 190, BSs 110, 120, 130, 140, 150, 160, 170, and radio controller 180, as the SU 190 (while disabled) moves from location 190A to location 190C and subsequently transitions to an enabled state and seeks communications services while at location 190C.

At processing step 402 in FIG. 4A, the SU 190 powers on or otherwise transitions from a disabled state to an enabled state and begins to scan for control channels that would indicate an available BS to register with. For example, the SU 190 may be pre-configured with known identities of control channels for the region in which it is operating, and may apply some logic in determining a scan order of the control channels pre-configured at the SU 190. In one embodiment, the SU 190 may first scan a last control channel on which the SU 190 operated, and absent finding an active signal on that last control channel, proceed to scan one or more adjacent control channels (e.g., adjacent control information identifying control channels of adjacent radio sites and that was broadcast on that last control channel and stored at the SU 190). Absent finding an active control signal on the one or more adjacent control channels, the SU 190 may proceed to either a programmed control channel scan (e.g., a pre-configured list of the most likely control channels on which to find an active control signal less than all of the control channels pre-configured at the SU 190) or a full channel scan (e.g., all of the control channels pre-configured at the SU 190 or all known channels, including traffic channels, pre-configured at the SU 190).

At the same time that the SU 190 is scanning control channels at step 402, it is assumed that each BS 110, 120, 140, and 160 within communication range of SU 190 is in a de-activated state monitoring a same system-wide hailing channel. The hailing channel is a particular channel, preconfigured in a trunked radio system in which SUs operate and preferably separate from any configured control or traffic channels used in the trunked radio system, that all de-activated trunked BSs in the system monitor for a hailing signal from SUs seeking to activate one or more de-activated trunked BSs so as to receive communications services from the trunked radio system. In other embodiments, and because the hailing channel is a receive-only channel (e.g., half-duplex uplink channel), it may be borrowed from an otherwise (currently) inactive full-duplex traffic or control channel assigned elsewhere in the trunked radio system. The particular hailing channel monitored by each BS may be pre-programmed at each BS, or may be identified by an instruction sent to each BS via radio controller 180, identifying one or more of a frequency, time slot, and code associated with the system-wide hailing channel. Each SU in the radio system may similarly be pre-programmed with the identity of the hailing channel, or may receive the identity of the hailing channel indirectly from the radio controller 180 via a control channel broadcast from one of the BSs such as BSs 110, 120, 130, 140, 150, 160, 170 prior to the SU transitioning from an activated state to a deactivated state.

In any event, and responsive to the SU 190 being unable to locate an active control signal at step 402, the SU 190 transmits a hailing signal 406 on the hailing channel. The transmission of the hailing signal 406 may occur at any time during or after the scan process of step 402. For example, it may occur responsive to the SU 190 failing to find an active control signal on the last control channel, responsive to the SU 190 failing to find an active control signal on the adjacent control channels, responsive to the SU 190 failing to find an active control signal on the pre-programmed list of control channels, responsive to the SU 190 failing to find an active control signal on the pre-programmed list of all control channels, and/or responsive to the SU 190 failing to find an active control signal on all known channels (including control and traffic channels).

The hailing signal 406 transmitted on the hailing channel may include a first identifier identifying the signal has a hailing signal, a second identifier uniquely identifying the transmitting SU 190 (such as a MAC address or radio identifier), and optional authentication information that may be used by each receiving BS to authenticate the hailing signal 406 and/or SU 190. Authentication information could include, for example, a private or public key, an authentication phrase such as a username and/or password, a challenge or response of a challenge/response exchange, or some other type of authentication information. The hailing signal 406 could be sent in the clear or encrypted.

As shown in FIG. 4A, and assuming that each of BSs 110, 120, 140, and 160 is within communication range of the SU 190, each BS 110, 120, 140, and 160 receives the hailing signal 406 transmitted by the SU 190 on the hailing channel. BSs outside of the communication range of SU 190, such as BSs 130, 150, and 170 of FIG. 1, would not receive the hailing signal and would continue to idle on and monitor the hailing channel until instructed otherwise, or until some other SU transmits a hailing signal within their range.

At steps 410-416, each respective BS 110, 120, 140, 160 that received the hailing signal 406 processes the signal, including executing any necessary decryption of the signal or authentication of the signal or the SU 190, and responsive to receiving the (optionally decrypted and/or authenticated) hailing signal, switches from the hailing channel to a respective control channel assigned to or configured at each respective BS. The control channel may be a single frequency on which a transmit portion of the control channel (e.g., BS to SU downlink) and a receive portion of the control channel (e.g., SU to BS uplink) are separated by time or code. In another embodiment, the control channel may include a pair of separated frequencies such that one frequency provides a transmit portion of the control channel and another paired frequency provides a receive portion of the control channel.

For example, BS 110 may switch from the hailing channel to a first control channel CC1, BS 120 may switch from the hailing channel to a second control channel CC2, BS 140 may switch from the hailing channel to a third control channel CC3, and BS 160 may switch from the hailing channel to a fourth control channel CC4.

At a same time, or soon before or after switching from the hailing channel to their respective control channels, each BS 110, 120, 140, 160 may optionally transmit a notification message 417 to radio controller 180 informing the radio controller 180 of the reception of the hailing signal 406 on the hailing channel, perhaps also including the identity of the SU 190 that transmitted the hailing signal 406. Radio controller 180 could then use this information in tracking multiple SUs in the radio system, and in determining whether to instruct one or more of the BSs transmitting on their respective control channel to return to the de-activated state monitoring the hailing channel.

In one embodiment, notification messages 417, including the identity of the requesting SU 190, may be transmitted to radio controller 180 before steps 410-416, and radio controller 180 may verify that the requesting SU 190 is authorized on the system before allowing or instructing BSs 110, 120, 140, and 160 to switch to their respective control channels. In still another embodiment, each BS 110, 120, 140, and 160 may report a signal measurement parameter (such as signal strength or signal quality) in notification messages 417, and radio controller 180 may use the signal measurement parameter to chose a single BS reporting a highest signal measurement parameter to switch to its respective control channel and begin transmitting its respective control signal, allowing the other BSs to remain in their de-activated state (e.g., only one of steps 410-416 is performed and only one control signal transmission 418-424 is performed). Other possibilities exist as well.

As illustrated in FIG. 4A, after switching to their respective separate control channels, each BS that received the hailing signal 406 begins transmitting a control signal 418, 420, 422, 424 on their respective control channel CC1, CC2, CC3, CC4. The control signal may be a continuous, periodic, or intermittently transmitted signal, any one of which causes additional power consumption at each BS compared to the de-activated state it was in at step 404. The transmitted control signal aids SUs in locating the respective BS, and may provide additional information to SUs receiving it, such as identifying where control channels for adjacent radio sites could be found, an identity of the BS such as a hardware address, IP address, or BS identifier, providing authentication information that may be used to further communicate with the BS, or other information.

While FIG. 4A illustrates that the control signals 418, 420, 422, 424 are being transmitted towards SU 190 for ease of illustration, in practice, the control signals 418, 420, 422, 424 are broadcast on respective control channels CC1, CC2, CC3, CC4 for receipt by any SUs operating in respective coverage areas. Furthermore, while FIG. 4A illustrates SU 190 receiving all four control signals 418, 420, 422, 424, SU 190 may, in practice, locate only one, some, or all of the control signals 418-424 based on its scan logic.

During and/or after transmitting respective control signals 418-424 one or more times on respective transmit portions of control channels CC1-CC4, BSs 110, 120, 140, and 160 monitor respective receive portions of control channels CC1-CC4 for a registration response from the SU 190 at monitoring steps 426-432. Each BS 110, 120, 140, and 160 may continue to monitor their respective control channel, and continue to continuously, periodically, or intermittently transmit control signals on their respective control channels, until a termination event. The termination event may be an expiration of a timer that tracks the amount of time that has passed since the BS began transmitting on the respective control channel, the number of times the BS has transmitted a periodic or intermittent control signal on the respective control channel, or some other metric that provides a cut-off time at which it can be assumed that the SU 190 has decided not to register with that particular BS. For example, cut-off time may be 10 seconds after the BS starting transmitting the first control signal, may be 50 transmissions of a periodic or intermittent control signal, or may be some other value. In another embodiment, the termination event may be an indication from another BS or from the radio controller 180 that the SU 190 has registered with another BS. In still another embodiment, the termination event may be an explicit instruction from the radio controller 180 to return to the de-activated state monitoring the hailing channel.

After transmitting the hailing signal 406, the SU 190 may implement a short delay (e.g., 300-400 ms) to allow the BSs to switch from the hailing channel to their respective control channels, and may subsequently begin scanning control channels for transmitted control signals again at step 436 in FIG. 4B. While FIG. 4 illustrates step 436 as occurring after monitoring steps 426-432 for illustrative convenience, in practice, step 436 may start and/or continue from any time after transmitting hailing signal 406 to any time prior to transmitting registration message 438.

The order of and the number of control channels scanned at step 436 may be identical to the order and number of control channels scanned at step 402. In another embodiment, the order and/or number of control channels is different.

For example the SU 190, similar to step 402, may at step 436 first scan a last control channel on which the SU 190 operated, and absent finding a transmitted control signal on that last control channel, proceed to scan one or more adjacent control channels. Absent finding a transmitted control signal on the one or more adjacent control channels, the SU 190 may proceed to either a programmed control channel scan or a full channel scan.

In another example, the SU 190 may have first scanned a last control channel on which the SU 190 operated and one or more adjacent control channels at step 402, after which it transmitted the hailing signal 406. Then, at step 436, SU 190 may proceed directly to either a programmed control channel scan or a full channel scan. In one particular embodiment, at step 436, SU 190 may proceed directly to a programmed control channel scan and, absent finding a transmitted control signal, re-transmit a second hailing signal on the hailing channel prior to executing a full channel scan. If no control signal is found after the full channel scan, SU 190 may re-transmit the hailing signal 406 on the hailing channel and re-start the same scanning process as in steps 402 and/or 436, in a cyclical manner, until either a control signal is found or a scanning timer, tracking the amount of time spent scanning for a control signal or a number of cycles through scanning steps 402 and/or 436, expires and an error signal provided to a user indicating that a valid service provider could not be found.

Assuming that SU 190 locates one of the control signals 418-424 during its scan process 436 (in this case, control signal 418 on CC1 from BS 110 in particular), the SU 190 responsively transmits a registration request 438 on the transmit portion of CC1. In some embodiments, the SU 190 may locate a plurality of the control signals 418-424 during the scanning step 436, and may chose the BS to register with based on measured characteristics of the received control signal, such as signal strength and/or signal quality. In other embodiments, the SU 190 may register with the BS associated with the first control signal it locates in its scan.

Upon receipt of the registration request 438, the BS 110 processes the request at step 440. At step 440, the BS 110 may, perhaps with the aid of radio controller 180, initially or further authenticate SU 190 for communications services, and in any event may send a registration notice 442 to radio controller 180 informing the radio controller 180 that SU 190 has requested registration, or has actually registered with, BS 110.

At step 444, the radio controller 180 may process the registration notice 442. At this step, and in view of the knowledge gained from notification messages 417 regarding which BSs had switched away from the hailing channel in response to receiving the hailing signal 406, radio controller 180 may optionally transmit instructions 446 to each of the remaining BSs 120, 140, and 160 to return to the hailing channel since SU 190, the SU that transmitted the hailing signal that caused them to transition from a de-activated state to an activated state, has registered with BS 110. In other embodiments in which notification messages 417 are not transmitted to radio controller 180, radio controller 180 may transmit a similar message to all BSs under its control informing them (and perhaps including the identity of the SU 190) of SU 190's registration with BS 110, so all other BSs could compare SU 190's identifier in the message from radio controller 180 with the identifier included in the hailing signal 406 and, if they match, independently return to the de-activated state monitoring the hailing channel (assuming they are not actually serving SU 190 or some other active SU at the time).

Upon receiving the optional messages 446, each respective BS 120, 140, and 160 then returns to the de-activated state at optional step 448 and, as such, returns to monitoring the hailing channel, as in step 404.

Also at step 444, radio controller 180 may optionally decide to provide registration confirmation and/or adjacent radio site control channel information 450 to BS 110 for further transfer to SU 190 via optional transmission 452 on CC1. At optional step 454, the SU 190 may process and/or store the registration confirmation and/or adjacent site control channel information.

At optional step 456, after activating and registering with BS 110, SU 190 may initiate a new voice or data call via a new call request 456 transmitted to BS 110 on the receive portion of control channel CC1 and BS 110 would receive the new call request from SU 190.

III. Conclusion

In accordance with the foregoing, a method and a device to support site activation using a hailing channel are disclosed that allows for activation and de-activation of trunked radio sites based on subscriber unit transmission of a hailing signal, allowing trunked radio sites having a continuous, periodic, or intermittent transmitted control signal to be activated and de-activated as needed, saving power and resources in less dense areas, while still providing reliable emergency services on demand, when needed. As a result, a more power efficient, robust, and adaptable communications system can be provided across a varying geographic range, improving response times and communication capabilities of incidence response groups in less dense, perhaps rural areas. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A subscriber unit configured to communicate via a trunked radio system, the subscriber unit comprising:
   a memory;
   a transceiver comprising a transmitter and a receiver; and
   a processor configured to:
      scan, via the receiver, a first set of one or more preconfigured control channels for a control signal transmitted by a trunked base station in the trunked radio system;
      responsive to failing to locate a control signal on any one of the first set of one or more preconfigured control channels:
         tune the transmitter to a preconfigured hailing channel and transmit, via the transmitter, a hailing signal on the hailing channel; and
         subsequently scan, via the receiver, a second set of one or more preconfigured control channels for a control signal transmitted by a trunked base station in the trunked radio system.

2. The subscriber unit of claim 1, wherein the control signal is one of a continuous and periodic signal broadcast on the control channel by a corresponding trunked base station, the control channel being a channel dedicated for transmission and reception of control signaling by the corresponding trunked base station, including the assignment of traffic channels for newly requested radio calls.

3. The subscriber unit of claim 1, wherein the processor is further configured to, responsive to receiving a particular control signal on a corresponding control channel transmitted by a particular trunked base station, transmit, on the control channel, a registration request to the particular trunked base station.

4. The subscriber unit of claim 3, wherein the processor is further configured to, after registering with the particular trunked base station, transmit a new call request, via the corresponding control channel, to the particular trunked base station.

5. The subscriber unit of claim 3, wherein the processor is further configured to, after registering with the particular trunked base station, receive a notification from the particular trunked base station identifying a second adjacent radio site, including identifying where a second control channel for the second adjacent radio site could be found.

6. The subscriber unit of claim 1, wherein the hailing channel is a particular channel, preconfigured in a trunked radio system in which the subscriber unit operates, that all de-activated trunked base stations in the system monitor for a hailing signal from subscriber units seeking to activate one or more de-activated trunked base stations so as to receive communications services from the trunked radio system.

7. The subscriber unit of claim 1, wherein the hailing signal includes an identifier uniquely identifying the subscriber unit.

8. The subscriber unit of claim 7, wherein the hailing signal further includes authentication information for use by trunked base stations receiving the hailing signal to authenticate the subscriber unit.

9. The subscriber unit of claim 8, wherein the authentication information is one of a public and a private key.

10. The subscriber unit of claim 1, wherein the processor is further configured to delay scanning the second set of one or more preconfigured control channels for at least a first non-zero period of time after transmitting the hailing signal to allow time for receiving trunked base stations to switch from the hailing channel to their respective control channels.

11. The subscriber unit of claim 1, wherein the first set of one or more preconfigured control channels is less than all control channels preconfigured at the subscriber unit, and the second set of one or more preconfigured control channels is all of the control channels preconfigured at the subscriber unit.

12. A trunked base station comprising:
   a memory;
   a transceiver comprising a transmitter and a receiver; and
   a processor configured to:
      tune the receiver to a pre-configured hailing channel and monitor the hailing channel for a hailing signal indicating a presence of a subscriber unit within the base station's coverage area; and
      responsive to receiving a particular hailing signal from a particular subscriber unit, tune the transmitter to a transmit portion of a pre-configured trunked control channel and transmit, via the transmitter, a control signal, and tune the receiver to a receive portion of the pre-configured trunked control channel and monitor, via the receiver, for a registration response to the control signal.

13. The base station of claim 12, wherein the processor is further configured to, while monitoring for the hailing signal, refrain from transmitting signals on any control or traffic channels.

14. The base station of claim 12, wherein the control signal is one of a continuous and periodic signal broadcast on the transmit portion of the control channel within the base station's coverage area, a control channel being a channel, including the receive and the transmit portions, dedicated for transmission and reception of control signaling, including the assignment of traffic channels for newly requested radio calls.

15. The base station of claim 14, wherein the control channel is a time division multiple access (TDMA) channel, and the transmit portion and the receive portion of the control channel are separated by time slots on the TDMA control channel.

16. The base station of claim 14, wherein the control channel is a frequency division multiple access (FDMA) channel pair, and the transmit portion and the receive portion of the control channel are separated by frequency.

17. The base station of claim 12, wherein the processor is further configured to, responsive to failing to receive the registration response to the control signal, re-tune the receiver to the pre-configured hailing channel and monitor the hailing channel for another hailing signal.

18. The base station of claim 12, wherein the processor is further configured to, responsive to receiving the registration response to the control signal from the subscriber unit, continue to transmit the control signal on the control channel via the transmitter, and monitor for new call requests on the control channel via the receiver.

19. The base station of claim 18, wherein the processor is further configured to, responsive to receiving the registration response to the control signal from the subscriber unit, transmit a notice of registration to a radio controller including an identifier identifying the subscriber unit so that other base stations may be instructed to halt transmitting their corresponding control signals.

20. The base station of claim 12, wherein the processor is further configured to, responsive to receiving an indication from a radio controller that the subscriber unit has registered with a different base station, halt the transmitting of the control signal.

21. The base station of claim 12, wherein the hailing channel is a particular channel, preconfigured in a trunked radio system in which the trunked base station operates, that all de-activated trunked base stations in the system monitor for a hailing signal from a subscriber unit seeking to activate one or more de-activated trunked base stations so as to receive communications services from the trunked radio system.

22. The base station of claim 12, wherein the processor is further configured to, responsive to receiving the registration response to the control signal from the subscriber unit, inform the subscriber unit, via the transmitter, of the availability of a second adjacent radio site including identifying where a second control channel for the second adjacent radio site could be found.

* * * * *

UNITED STATES PATENT AND TRADEMARK OFFICE
CERTIFICATE OF CORRECTION

PATENT NO. : 8,982,825 B2
APPLICATION NO. : 13/800424
DATED : March 17, 2015
INVENTOR(S) : George R. Economy et al.

Page 1 of 1

It is certified that error appears in the above-identified patent and that said Letters Patent is hereby corrected as shown below:

IN THE SPECIFICATION:

In Column 6, Lines 31-32, delete "(3GGP or 3GGP2)" and insert -- (3GPP or 3GPP2) --, therefor.

In Column 6, Lines 46, delete "code code" and insert -- code --, therefor.

Signed and Sealed this
Nineteenth Day of July, 2016

Michelle K. Lee
*Director of the United States Patent and Trademark Office*